No. 822,989. PATENTED JUNE 12, 1906.
C. M. SCHOOLEY & O. N. CASEY.
NUT LOCK.
APPLICATION FILED JUNE 20, 1903.
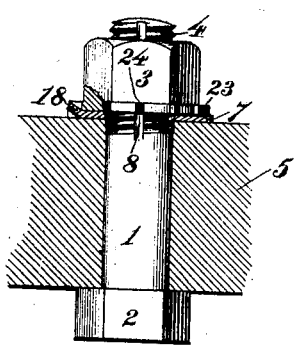
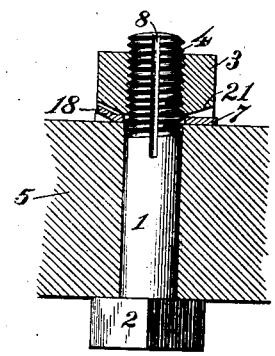
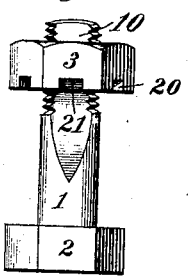
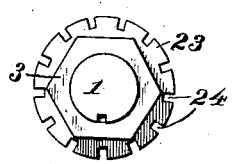
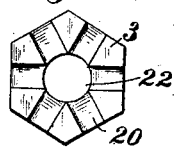
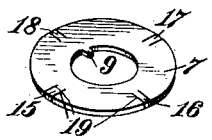
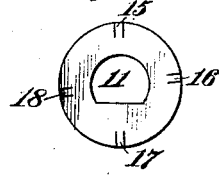
Witnesses
H. S. Austin
Frank D. Kent
Inventors:
Clayton M. Schooley
and Oden N. Casey
By Jasper Atkins
Attorney.

UNITED STATES PATENT OFFICE.

CLAYTON M. SCHOOLEY AND ODEN N. CASEY, OF LEESBURG, VIRGINIA, ASSIGNORS OF THIRTY-FIVE ONE-HUNDREDTHS TO SAID SCHOOLEY, FIFTEEN ONE-HUNDREDTHS TO SAID CASEY, AND ONE-HALF TO JULIAN H. GRUBB, OF LEESBURG, VIRGINIA.

NUT-LOCK.

No. 822,989.     Specification of Letters Patent.     Patented June 12, 1906.

Application filed June 20, 1903. Serial No. 162,362.

*To all whom it may concern:*

Be it known that we, CLAYTON M. SCHOOLEY and ODEN N. CASEY, of Leesburg, in the county of Loudoun, State of Virginia, have invented certain new and useful Improvements in Nut-Locks, of which the following is a complete specification, reference being had to the accompanying drawings.

Our invention relates to improvements in base-washer nut-locks, and has for its object to provide in such a device improved means for irrevolubly uniting a nut and its bolt.

In the accompanying drawings, Figure I is a side elevation of a bolt and nut embodying one form of our invention, partially in section, showing in section an object to which it is applied. Fig. II is a similar view showing a modified form of embodiment of our invention. Fig. III is a side elevation of such a nut as is shown in Fig. II applied to a slightly-modified form of bolt. Fig. IV is a top plan view of the bolt and nut shown in Fig. I detached. Fig. V is a bottom plan view of the nut shown in Fig. II detached. Fig. VI is a top plan view of the subject-matter of Fig. III. Fig. VII is a perspective view of a washer adapted to fit such a bolt as is shown in Figs. I and II. Fig. VIII is a plan view of a washer adapted to fit a bolt of the shape shown in Fig. III.

Referring to the numerals on the drawings, 1 indicates a bolt, 2 the head thereof, and 3 a nut threaded to fit the threaded end 4 of the bolt. 5 indicates, by way of example, an object through which the bolt is passed.

Our invention being comprehended in the class of base-washer nut-locks includes as a member any suitable form of washer 7—such, for example, as that shown in Fig. VII. The washer is free to travel lengthwise of the threaded portion of the bolt, but is irrevolubly fixed thereto in order that when the nut is advanced to the required position upon the bolt it may be secured in that position by securing it to the washer. To that end the bolt may be provided with a longitudinal channel 8 and the washer with a lug 9, loosely fitting said channel. Instead of the channel 8 and lug 9 the threads of the bolt may be mutilated by a flat side 10, and the bore 11 of the washer may be correspondingly shaped, as shown in Fig. VIII.

As a means of securing the nut to the washer we prefer to make the washer of metal of sufficient flexibility to permit of its being bent as required, and upon it we provide at suitable intervals and availably disposed a series of tongues 15, 16, 17, and 18. Preferring to make the washer disk-shaped, each tongue may be defined by a pair of parallel kerfs 19. By this arrangement the washer is made and kept perfectly smooth and unobstructive until it is bent to perform its function.

To adapt the nut to receive the tongue for fastening it in position, the nut may be provided upon its bottom with a plurality of radial or diametrical channels 20, each radial channel having its bottom defined by a face 21, upwardly inclined from the bore 22 of the nut outwardly. (Compare Figs. II, III, and V.) The shape of the channels 20 facilitates the bending of a selected tongue into a selected channel through the employment of a suitable instrument, which for the purpose may be inserted between the tongue and the object against which the washer lies in practice. The shape also facilitates the driving back of an engaging tongue to liberate the nut when desired.

Instead of channels formed upon the base of the nut, as above described, the nut may be provided with a circular base-flange 23, provided at frequent intervals with radial channels or notches 24, as shown in Figs. I and IV. A tongue of the washer being exposed through a notch 24 may be bent up into an engaging position, as shown in Fig. I, or driven down out of engagement for the liberation of the nut, as required.

What we claim is—

1. The combination with a bolt and its nut of a disk-shaped washer, provided with a plurality of radial tongues, each tongue being defined by a pair of parallel kerfs, radial channels upon the nut adapted to receive into close-fitting engagement any one of said tongues when deflected into it and means for operatively securing the washer and bolt together.

2. The combination with a bolt and its nut of a disk-shaped washer, provided with a plurality of radial tongues, each tongue being defined by a pair of parallel kerfs, radial channels upon the nut adapted to receive into close-fitting engagement any one of said tongues when deflected into it, each of said channels being formed in the bottom of the nut and each having its bottom defined by a face upwardly inclined from the bore of the nut outwardly, and means for operatively securing the washer and bolt together.

3. The combination with a bolt, nut and channels in the nut, said channels being so formed as to leave the face of the nut unobstructed, of a flat washer provided with radial tongues, each defined by a pair of parallel kerfs and capable of deflection whereby the nut may ride smoothly over the face of the washer until it is set in place and then be secured by the deflection of a tongue of the washer and means for operatively securing the washer and bolt together.

In testimony of all which we have hereunto subscribed our names.

CLAYTON M. SCHOOLEY.
ODEN N. CASEY.

Witnesses:
W. PRESTON GIBSON,
JULIAN H. GRUBB.